Oct. 21, 1941.  D. A. BRIDGES  2,259,728
APPARATUS FOR MAKING HOLLOW GLASS BUILDING BLOCKS
Filed July 26, 1939  4 Sheets-Sheet 1
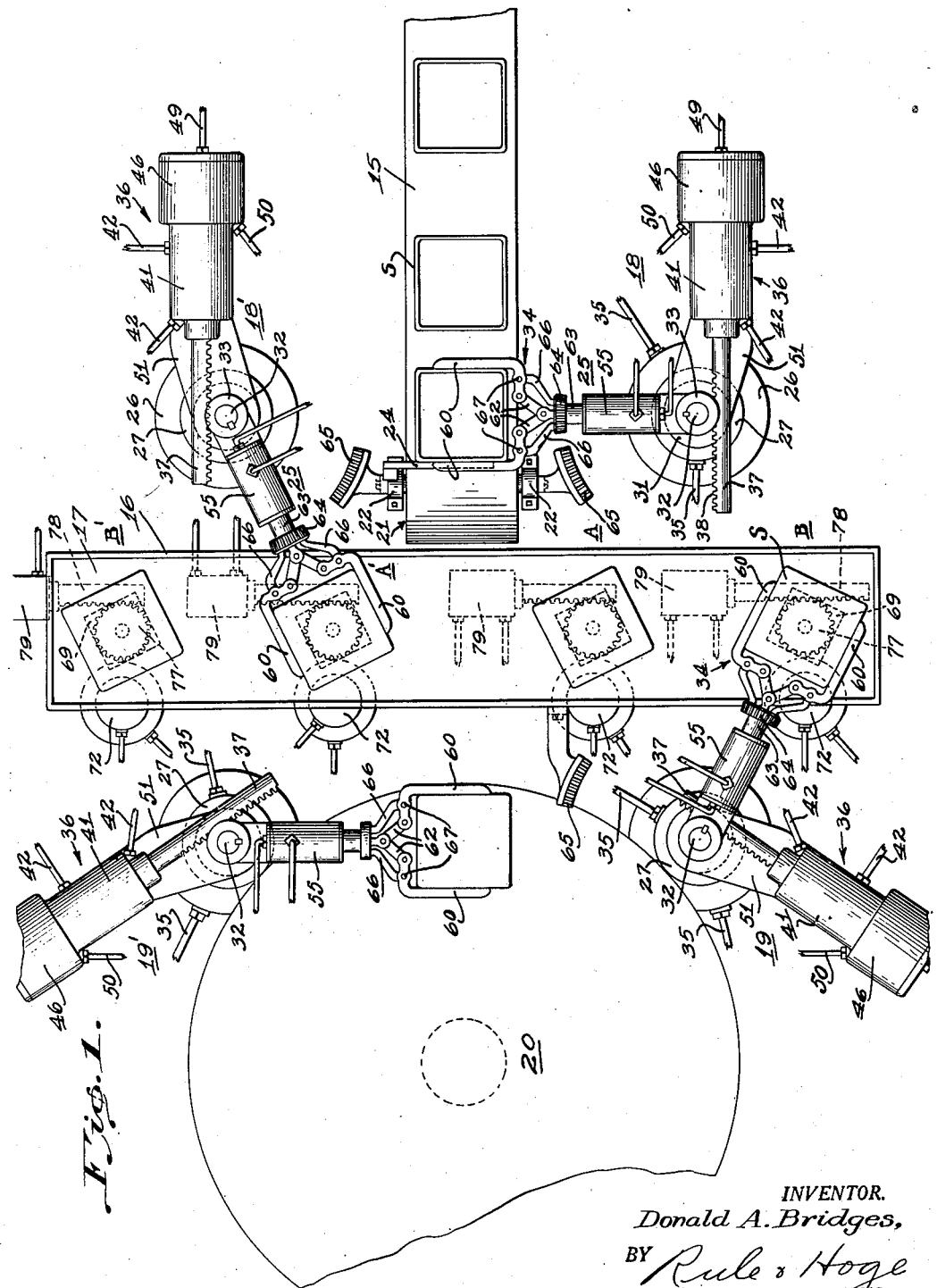
INVENTOR.
Donald A. Bridges,
BY Rule & Hoge
ATTORNEYS.

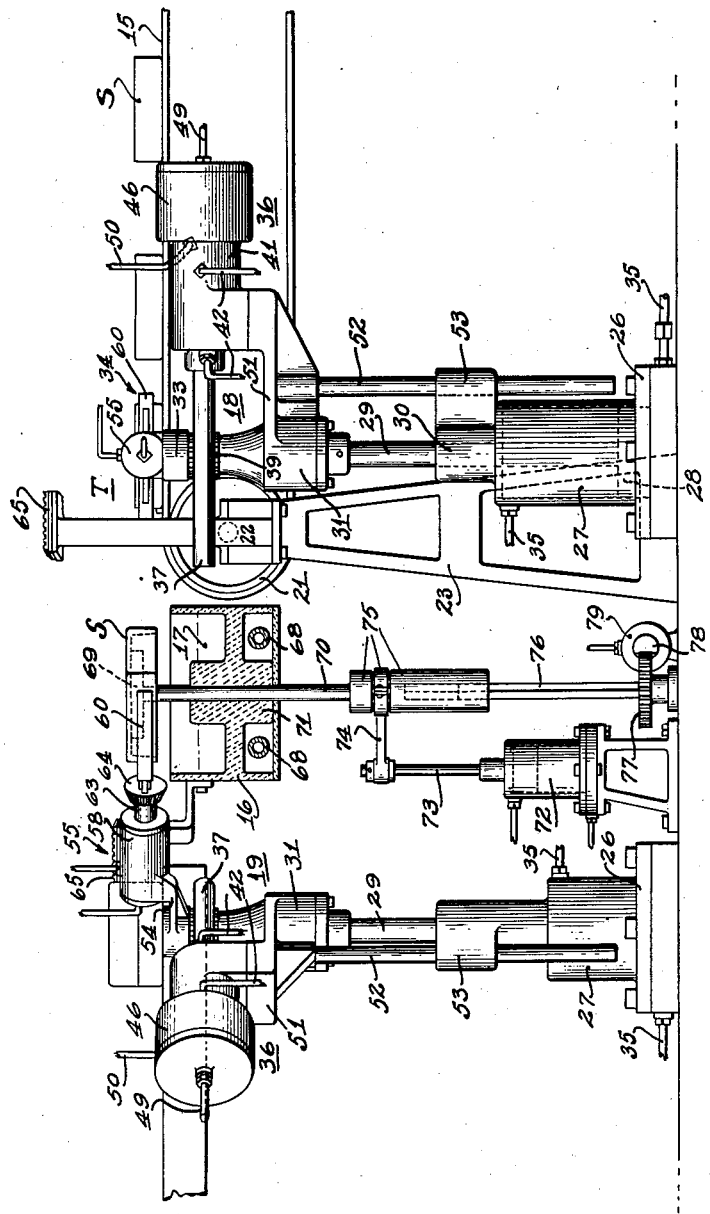

Oct. 21, 1941.   D. A. BRIDGES   2,259,728
APPARATUS FOR MAKING HOLLOW GLASS BUILDING BLOCKS
Filed July 26, 1939   4 Sheets-Sheet 3
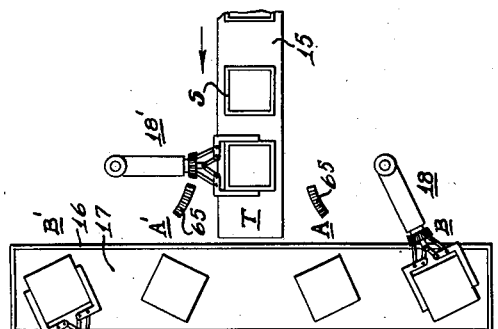
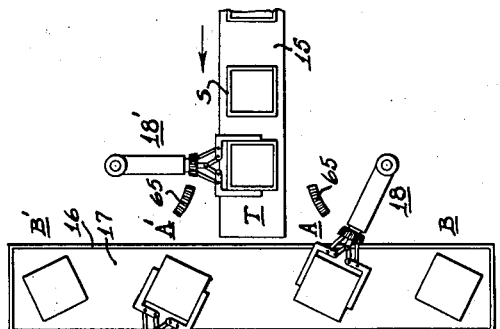
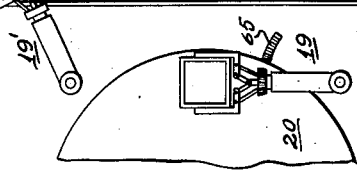
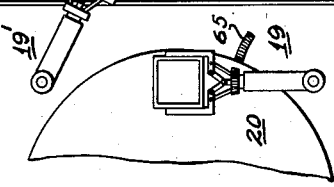
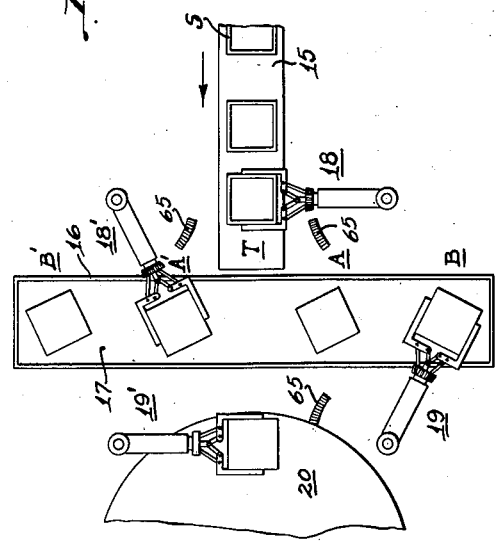
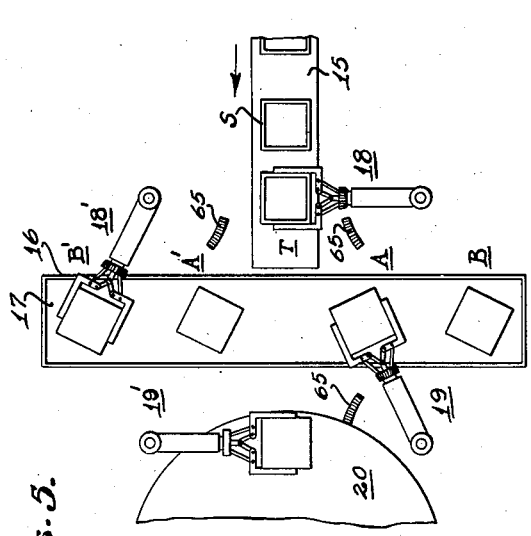
INVENTORS.
Donald A. Bridges,
BY
ATTORNEYS.

Oct. 21, 1941.    D. A. BRIDGES    2,259,728
APPARATUS FOR MAKING HOLLOW GLASS BUILDING BLOCKS
Filed July 26, 1939    4 Sheets-Sheet 4
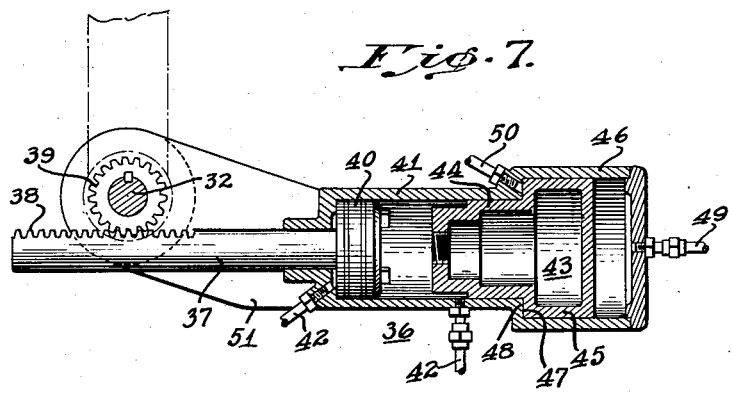
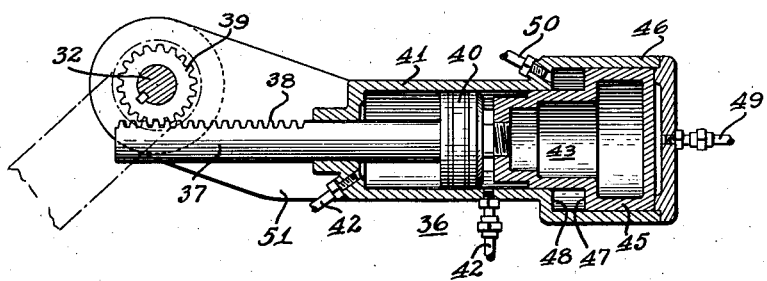
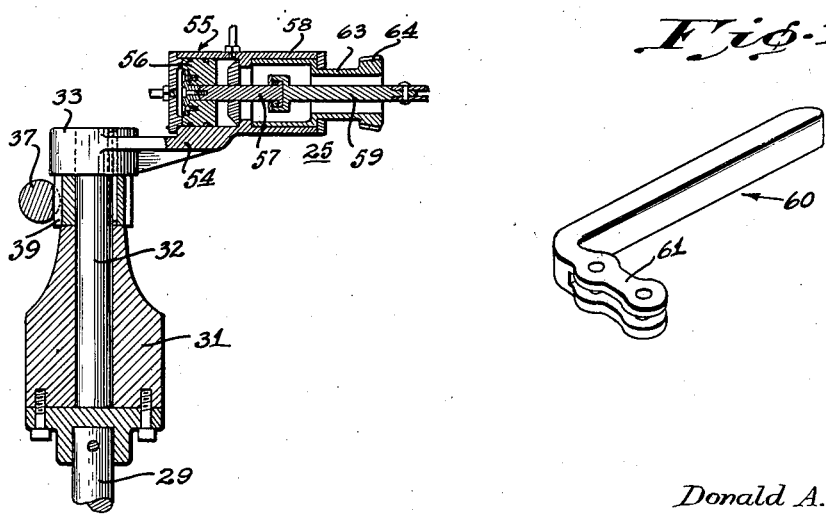
INVENTOR.
Donald A. Bridges,
BY Rule & Hoge
ATTORNEYS.

Patented Oct. 21, 1941

2,259,728

UNITED STATES PATENT OFFICE 2,259,728

APPARATUS FOR MAKING HOLLOW GLASS BUILDING BLOCKS

Donald A. Bridges, Muncie, Ind., assignor to Owens-Illinois Glass Company, a corporation of Ohio Application July 26, 1939, Serial No. 286,656

13 Claims. (Cl. 49—1)

The present invention relates to improvements in the manufacture of hollow glass building blocks and more particularly to an apparatus for automatically assembling the cup-like sections which are produced upon a conventional press type glass forming machine.

To date commercial hollow glass building blocks are composed of complementary cup-like sections which are pressed to their final shape on a standard press type machine, these sections being then united to produce a hollow hermetically sealed unit which preferably is partially vacuumized. In one type of apparatus, the block sections, or halves, are automatically deposited upon a conveyor at the point of removal thereof from the forming machine, these sections being positioned upon the conveyor with those edge portions to be united, facing upwardly. The conveyor carries these sections to a point in proximity to a pool of molten bonding medium. The sections are then transferred manually to the pool and after having their edge portions metallized, are removed from the pool and assembled to produce the hermetic seal referred to heretofore.

An object of the present invention is the provision of automatic means for transferring the block sections from the conveyor to the pool and upon completion of the metallizing operation, from the pool to an indexing table, upon which pairs of sections are automatically brought into proper registration with each other and assembled.

Another object of the invention is the provision of automatic means for inverting the sections during transfer thereof from the conveyor to the pool molten bonding medium so that the edge portions of the sections may be dipped into the latter.

A further object of the invention is the provision of novel means for imparting rotary movement to the block sections in a horizontal plane, while positioned a short distance above the surface of the pool of bonding medium, whereby to accurately locate the sections with respect to the mechanism which removes them from the pool. This feature is also of considerable importance in that it facilitates assembly of the block sections to create various ornamental effects or designs. For example, both block sections may have an identical rib design on their exposed faces, which, when the sections are assembled in one fashion, create a definite complete design or ornamental effect. By the simple step of rotating one section 90°, it is apparent that a radically different design may be produced.

Other objects will be in part apparent and in part pointed out hereinafter.

In the drawings:

Fig. 1 is a fragmentary plan view of an apparatus embodying the present invention.

Fig. 2 is a side elevational view thereof with parts shown in cross section.

Figs. 3, 4, 5, and 6 are plan views more or less diagrammatically illustrating the successive steps involved in the transfer of the block sections from the conveyor to the pool of bonding medium and from the latter to the indexing table.

Fig. 7 is a horizontal sectional view partly in elevation through one of the piston motors which oscillates a transfer arm.

Fig. 8 is a view similar to Fig. 7 illustrating one position the parts assume in transferring the block sections.

Fig. 9 is a vertical sectional elevational view of the mechanism for actuating the jaws of one of the section supporting arms.

Fig. 10 is a perspective view of one of the jaws.

In the illustrated embodiment of my invention, the conveyor 15 transports block sections from a forming machine (not shown) to a position in proximity to and at one side of an elongated container 16 for a supply body 17, or pool, of molten bonding medium, the upper surface of the latter being exposed so that those edges of the block halves to be united, may be dipped into the bonding medium and coated thereby. The block sections are transferred from the conveyor 15 to the container 16 by means of transferring and inverting devices 18 and 18', one of such devices being positioned at each side of said conveyor. Upon completion of the edge coating operation, the block sections are removed from the container 16 by transferring devices 19 and 19' and assembled upon an indexing table 20 which may well be of the construction illustrated in Patent #2,143,696 issued Jan. 10, 1939, to M. K. Holmes et al. entitled Apparatus for assembling hollow building blocks, to which reference may be had for details of construction.

The conveyor 15 may well be of the continuous belt type horizontally disposed and running over a driven pulley 21 (Fig. 1) which is journaled in bearings 22 at the upper end of a pedestal 23 or frame. An abutment 24 or stop in the form of a horizontally disposed arm is positioned across the upper reach of the conveyor 15 in proximity to the discharge end thereof, for the purpose of terminating the advancing motion of the block sections at a point in register with the gripping jaws of the transferring and inverting devices 18. Inasmuch as these transferring and inverting devices 18 are of identical construction and operation, the following detailed description will make reference to only one of the devices.

Each transferring and inverting device 18 (Figs. 1 and 2) includes an arm 25 which is capable of vertical reciprocation and oscillation in a horizontal plane through two different angles, the latter being necessary in order to facilitate positioning block sections at longitudinally spaced points in the pool 17 and the former being necessary in order that the arm may be properly engaged with and disengaged from the block sections. The specific construction illustrated consists of a base 26, (Figs. 1 and 2) a vertical piston motor 27 rising therefrom and enclosing a piston 28 which is connected to a piston rod 29, the latter extending upwardly through a guide 30. The upper end of the piston rod 29 (Figs. 2 and 9) is connected to a bearing 31 for a short vertical shaft 32, which extends a short distance above the bearing 31 and is connected to a collar 33 at the inner end of the aforementioned transferring arm 25. Jaws 34 for gripping the block sections, are mounted upon the outer end of said arm 25. Through the alternate admission of air under pressure to the opposite ends of the piston motor 27, by way of supply pipes 35, the arm 25 may be reciprocated vertically at regular time intervals.

Oscillation of the arm 25 through two different angles and in a horizontal plane is necessary in order to place the block sections at positions A and A' and B and B' (Fig. 1). The arm is swung through a comparatively short angle to place a block section at position A and through a somewhat longer angle for the purpose of placing a block section at position B. The difference in the angle through which the arm is swung is automatically controlled in part by a horizontal piston motor 36 (Figs. 1, 2, 7, and 8). This motor 36 includes a piston rod 37 provided on one side with a rack bar 38 which meshes with a pinion 39, the latter being keyed to the aforementioned shaft 32 between the bearing 31 therefor and the collar 33 at the inner end of the transfer arm 25. A piston 40 at the inner end of the piston rod 37, is enclosed in an air cylinder 41 and is intended to be reciprocated therein by the introduction of air under pressure to the opposite ends of the cylinder in alternation through supply pipes 42. Regulable control of the stroke of the piston and consequently the angle through which the transfer arm 25 is oscillated, is obtained by means of a piston 43 which has a reduced forward end 44 projecting into the aforementioned cylinder 41 and an inlarged guide portion 45 or head, which is slidingly mounted in an enlarged extension 46 of said cylinder 41. The forward end of the enlarged portion 45 of the piston 43 is provided with an annular shoulder 47 which engages an abutment 48 on the cylinder during that cycle of operations in which the transfer arm oscillates through the short angle. Such positioning of the piston 43 is obtained by the introduction of air under pressure through a supply pipe 49 at the outer end of the cylindrical extension 46. For the purpose of increasing the angle through which the transfer arm swings, such as is necessary in placing a block section at position B (Fig. 1), air under pressure is supplied to the cylindrical extension 46 by way of a pipe 50, with the result that the piston 43 is moved to the outer end of said extension and permits of a longer stroke on the part of the piston 40 and piston rod 47, which are directly connected through the rack and pinion mechanism to said arm.

The above described piston motor 36 is directly connected to the aforementioned vertical bearing 31 by means of an arm 51 or bracket, said parts being secured against movement by means of a depending vertical rod 52 which is carried by the bracket 51 and extends downwardly through a fixed guide 53 at the upper end of the piston motor 27 which raises and lowers the transfer device 18.

Each of the transfer arms 25 (Figs. 1, 9, and 10) includes a bracket 54 and a horizontal piston motor 55 mounted thereupon. A piston 56 in the motor, carries a piston rod 57 which extends horizontally into a bearing 58 where it is rotatably connected to a push rod 59 which is adapted to open and close the block gripping jaws 60. Each of these jaws (Fig. 10) is substantially L-shape, the base 61 thereof being connected at its free end to said push rod 59 by means of a link 62. Rotation of the jaws about the axis of the push rod 59 for the purpose of inverting the block sections during transfer thereof from the conveyor 15 to either of the positions A and B or A' and B', is obtained by means of a rotary collar 63 journaled in the aforementioned bearing 58 and carrying at its outer end a bevel pinion 64, which, during initial movement of the arm 25 away from the conveyor, meshes with a gear segment 65 (Fig. 1), the latter being of sufficient length to rotate the bevel pinion through an angle of 180°. Such motion is transmitted to the jaws 60 through arms 66, Fig. 1, which incidentally support said jaws 60 and are pivotally connected thereto by vertical hinge pins 67.

The above described construction of the transferring and inverting devices applies in its entirety to both of the devices 18 and 18' which are positioned one at each side of the conveyor 15 and to the transferring and inverting device 19 in the lower portion of Fig. 1. The other transferring device 19' at the upper left hand side of Fig. 1, omits the inverting feature in that it does not include the bevel pinion 64 and gear segment 65. Inversion of the sections handled by this particular device 19, is unnecessary because these sections are simply transferred from the container 16 and placed open side down upon and in register with corresponding sections which have previously been placed open side up upon the indexing table 20.

The container 16 for the pool of bonding medium (molten or otherwise) is of considerably greater length than width and is formed of any material that is suitable for melting and containing aluminum, copper, aluminum silicon alloys, etc. Burners 68 or the like, are positioned beneath and in close proximity to the bottom of the container 16 for the purpose of melting the metal in the container and maintaining it in sufficiently fluid condition to function properly. At spaced points (stations A, A', B, and B') lengthwise of the container, supporting devices 69 for the block sections are provided. Each of these devices includes a flat pad or block mounted at the upper end of a rotatable push rod 70 which rod is rotatably and slidably supported in a bearing 71 formed in the bottom wall of the container 16. As indicated heretofore, this support is adapted for vertical movement whereby to move the edge portions of a block section S into and out of contact with the bonding medium in the container 16. The supporting device is rotatable about the axis of the push rod 70 for the purpose of adjusting the angular position of the block section so that it may be engaged by one of the transferring devices 19 preparatory to placing the section upon the indexing table 20 and in some instances, for the additional purpose of altering the face design or ornamental appearance of the assembled block as compared with a block in which one section had been rotated only sufficiently to properly position it as and for the purpose just stated. Vertical movement of the supporting device is obtained by means of a piston motor 72 (Fig. 2) operating through a piston rod 73 and arm 74 which is operatively connected to the push rod 70 through a ball thrust bearing 75. The lower part of this bearing 75 has rotary driving connection through a rod 76 and pinion 77 to a rack bar 78 which in turn is operatively connected to a piston motor 79. All of these motors, as should be obvious, are intended to be connected to a suitable timing device, of which there are many types available in the open market, so that the various operations herein described are properly synchronized.

In the following description of the operation of this apparatus, reference will be had largely to Figs. 3 to 6 wherein the steps are more or less diagrammatically illustrated.

In Fig. 3 a completely assembled block is shown on the indexing table 20 and the latter is about to be moved approximately 90° preparatory to placing and assembling another pair of sections thereon. The first section for the next block will be transferred from position B (Fig. 3) by means of the transferring device 19 which inverts the section during movement thereof to the indexing table. Thus, the section will be positioned upon the indexing table as shown in Fig. 4. In proper timed relation to the movement of the transferring device 19, the transferring device 18 removes a section S from the conveyor 15 and places it upon the support 69 at position B to replace the section which is now resting upon the table. The transferring device 19' (Fig. 4) then carries the block section from position B' to the indexing table and places it upon and in accurate register with the section that has already been placed upon the table. These sections may, if desired, be thereafter treated in accordance with the disclosure in the aforementioned Holmes et al. Patent #2,143,696 that is subjected to top pressure and have any excess bonding medium removed therefrom. The table is again indexed and assembly of the next block is started by the transfer of the section from position A in the container 16 to the indexing table 20. This section is transferred and inverted by the transferring device 19. Here again a new block section is placed upon the support 69 by means of the transferring and inverting device 18. The upper section for the block now being assembled, is removed from position A' by the transferring device 19' and without inversion thereof, is brought into accurate alignment and contact with the other section. In all instances the transferring devices are extensible automatically, as brought out heretofore, for the purpose of compensating for the difference in the angle between the transferring station T as well as the assembly point on the indexing table and the positions B and B' in the pool of bonding medium.

In releasing the block sections, it will be understood that the jaws are first disengaged therefrom and thereafter the entire arm 25 is elevated to a position at which it may be swung clear of the section and returned to its initial position. This is accomplished by means of the piston motors 27 which are operated in synchronism with opening and closing of the jaws.

The aforementioned section supports 69, as stated, are movable to orient the sections S and thereby properly position them for engagement with the transferring devices 19 and 19' and if desired, for the purpose of creating various block designs, in the fashion described in some detail heretofore. It will be understood that operation of all of the piston motors etc., may be, and of necessity is, synchronized so that the transferring arms for example, do not interfere with each other in the performance of their respective functions.

Modifications may be resorted to within the spirit and scope of the appended claims.

I claim:

1. In apparatus of the character described, a container for a pool of bonding medium having an exposed upper surface, supports for holding cup-like sections of hollow glass building blocks with their edge portions dipping into the bonding medium, a conveyor for bringing sections to a station adjacent one side of the container, an assembly table on the other side of the container, mechanical means for transferring sections from the conveyor to the supports and thereafter removing the sections from the supports and assembling them upon said table, and devices for effecting inversion of the block sections during transfer thereof from the conveyor to said supports.

2. In apparatus of the character described, a container for a pool of bonding medium having an exposed upper surface, supports for holding cup-like sections of hollow glass building blocks with their edge portions dipping into the bonding medium, a conveyor for bringing sections to a station adjacent one side of the container, an assembly table on the other side of the container, mechanical means for transferring sections from the conveyor to the supports and thereafter removing the sections from the supports and assembling them upon said table, and devices for effecting inversion of alternate block sections during transfer thereof from said supports to the assembly table.

3. In apparatus of the character described, a container for a pool of bonding medium having an exposed upper surface, supports for holding cup-like sections of hollow glass building blocks with their edge portions dipping into the bonding medium, a conveyor for bringing sections to a station adjacent one side of the container, an assembly table on the other side of the container, mechanical means for transferring sections from the conveyor to the supports and thereafter removing the sections from the supports and assembling them upon said table, devices for effecting inversion of the block sections during transfer thereof from the conveyor to said supports, and devices for effecting inversion of alternate block sections during transfer thereof from said supports to the assembly table.

4. In apparatus of the character described, a container for a pool of bonding medium having an exposed upper surface, supports for holding cup-like sections of hollow glass building blocks with their edge portions dipping into the bonding medium, a conveyor for bringing sections to a station adjacent one side of the container, an assembly table on the other side of the container, mechanical means for transferring sections from the conveyor to the supports and thereafter removing the sections from the supports and assembling them upon said table, and means for moving said supports vertically to thereby alternately make and break contact between the block sections and the bonding medium.

5. In apparatus of the character described, a container for a pool of bonding medium having an exposed upper surface, supports for holding cup-like sections of hollow glass building blocks with their edge portions dipping into the bonding medium, a conveyor for bringing sections to a station adjacent one side of the container, an assembly table on the other side of the container, mechanical means for transferring sections from the conveyor to the supports and thereafter removing the sections from the supports and assembling them upon said table, means for moving said supports vertically to thereby alternately make and break contact between the block sections and the bonding medium, and mechanism for imparting horizontal rotary motion to the supports to adjust the angular position of the sections supported thereby.

6. In apparatus of the character described, mechanism for inverting and transferring a block section from one station to another, comprising jaws for gripping the section, a horizontal supporting arm for the jaws including means for opening and closing the jaws, means including an air operated piston motor for swinging the arm and jaws horizontally between spaced stations, rack and pinion mechanism for inverting the jaws independently of the arm proper during said swinging movement, and mechanism for moving said arm and jaws vertically.

7. In apparatus of the character described, mechanism for inverting and transferring a block section from one station to another, comprising jaws for gripping the section, a horizontal supporting arm for the jaws including means for opening and closing the jaws, means including an air operated piston motor for swinging the arm and jaws horizontally between spaced stations, rack and pinion mechanism for inverting the jaws independently of the arm proper during said swinging movement, mechanism for moving said arm and jaws vertically, and automatic means for periodically varying the stroke of the piston motor whereby to regulably control the angle of swinging movement of said arm.

8. In apparatus of the character described, mechanism for inverting and transferring a block section from one station to another, comprising jaws for gripping the section, a horizontal supporting arm for the jaws, mechanism for swinging said arm and jaws between spaced stations including a piston motor and a rack and pinion mechanism operatively connecting the motor and said arm, and rack and pinion mechanism for inverting said jaws independently of the arm proper during said swinging movement.

9. In apparatus of the character described, mechanism for inverting and transferring a block section from one station to another, comprising jaws for gripping the section, a horizontal supporting arm for the jaws, mechanism for swinging said arm and jaws between spaced stations including a piston motor and a rack and pinion mechanism operatively connecting the motor and said arm, rack and pinion mechanism for inverting said jaws independently of the arm proper during said swinging movement, and means for regulably controlling the stroke of the first-mentioned rack whereby to predetermine the angle through which said arm is swung.

10. In apparatus of the character described, mechanism for inverting and transferring a block section from one station to another, comprising jaws for gripping the section, a horizontal supporting arm for the jaws, means for opening and closing the jaws, mechanism for swinging said arm and jaws between spaced stations including a piston motor and a rack and pinion mechanism operatively connecting the motor and said arm, rack and pinion mechanism for inverting said jaws independently of the arm proper during said swinging movement, and means for regulably controlling the stroke of the first-mentioned rack whereby to predetermine the angle through which said arm is swung, said last named means including a cylinder connected to the piston motor, a piston in said cylinder having one end positioned for engagement with the piston of the motor, and means for moving the piston in said cylinder between two extreme positions.

11. In apparatus of the character described, mechanism for inverting and transferring a block section from one station to another, comprising jaws for gripping the section, a horizontal supporting arm for the jaws, means for opening and closing the jaws, mechanism for swinging the arm and jaws between spaced stations, rack and pinion mechanism for inverting the jaws independently of the arm proper during said swinging movement, and means for moving the arm and jaws vertically as a unit at said stations.

12. In apparatus of the character described, mechanism for inverting and transferring a block section from one station to another, comprising jaws for gripping the section, a horizontal supporting arm for the jaws, means for opening and closing the jaws, mechanism for swinging the arm and jaws between spaced stations, rack and pinion mechanism for inverting the jaws independently of the arm proper during said swinging movement, and means for moving the arm and jaws vertically as a unit at said stations, the last named means comprising a vertical piston motor and operative connection between the arm and motor.

13. In apparatus of the character described, a container for a pool of bonding medium having an exposed upper surface, devices for supporting the sections of hollow glass blocks over said surface, means including a piston motor for moving the devices vertically to thereby bring the edges of said sections into contact with the bonding medium, and means including a piston motor for imparting a predetermined degree of horizontal rotary movement to the devices about their vertical axes.

DONALD A. BRIDGES.